US007617368B2

(12) United States Patent
Van Dyke et al.

(10) Patent No.: US 7,617,368 B2
(45) Date of Patent: Nov. 10, 2009

(54) MEMORY INTERFACE WITH INDEPENDENT ARBITRATION OF PRECHARGE, ACTIVATE, AND READ/WRITE

(75) Inventors: James M. Van Dyke, Austin, TX (US); Brian D. Hutsell, Fort Worth, TX (US)

(73) Assignee: NVIDIA Corporation, Santa Clara, CA (US)

( * ) Notice: Subject to any disclaimer, the term of this patent is extended or adjusted under 35 U.S.C. 154(b) by 408 days.

(21) Appl. No.: 11/613,120

(22) Filed: Dec. 19, 2006

(65) Prior Publication Data
US 2007/0294470 A1 Dec. 20, 2007

Related U.S. Application Data

(60) Provisional application No. 60/813,803, filed on Jun. 14, 2006.

(51) Int. Cl.
*G06F 12/00* (2006.01)

(52) U.S. Cl. ...................... 711/156; 711/158

(58) Field of Classification Search ........... 711/5, 711/155, 152, 158, 156, 111, 154
See application file for complete search history.

(56) References Cited

U.S. PATENT DOCUMENTS

| 5,666,515 A | * | 9/1997 | White et al. ............. 711/152 |
| 2002/0194448 A1 | * | 12/2002 | Yu ............................ 711/173 |
| 2003/0117860 A1 | * | 6/2003 | Roohparvar ........... 365/189.12 |

OTHER PUBLICATIONS

Micron Semiconductor Products, Inc., "2M, Smart 5 BIOS-Optimized Boot Block Flash Memory," Flash Memory www.micron.com, copyright 2000, Micron Technology, Inc., pp. 1-12.*

Keeth, et al., "DRAM circuit design: a tutorial," IEEE Press, 2001, pp. 16-23, 142-153.*

* cited by examiner

*Primary Examiner*—Pierre-Michel Bataille
(74) *Attorney, Agent, or Firm*—Cooley Godward Kronish LLP

(57) ABSTRACT

A memory interface coupling a plurality of clients to a memory having memory banks provides independent arbitration of activate decisions and read/write decisions. In one implementation, precharge decisions are also independently arbitrated.

18 Claims, 3 Drawing Sheets

MEMORY INTERFACE WITH INDEPENDENT ARBITRATION OF PRECHARGE, ACTIVATE, AND READ/WRITE

CROSS REFERENCE TO RELATED APPLICATION

This application claims the benefit and priority of Provisional Application No. 60/813,803, entitled "MEMORY INTERFACE WITH INDEPENDENT ARBITRATION OF PRECHARGE, ACTIVATE, AND READ/WRITE," and filed on Jun. 14, 2006, the disclosure of which is incorporated herein by reference in its entirety.

FIELD OF THE INVENTION

The present invention is generally related to memory interfaces. More particularly, the present invention is directed towards a memory interface for a memory having a memory bank with precharge, activate, and read/write phases.

BACKGROUND OF THE INVENTION

FIG. 1 illustrates a prior art memory interface 100. An arbiter 105 receives memory access requests from a plurality of clients 110-A, 110-B, and 110-C. The arbiter 105 arbitrates memory access requests from the different clients and places a sequence of commands into command queue 115 to service each client. Command queue 115 is typically implemented as a first in, first out (FIFO) such that the commands progress in order through the FIFO. A dynamic random access memory (DRAM) controller 120 issues commands to a DRAM memory (not shown in FIG. 1. As illustrated in FIG. 2, a DRAM memory may include a memory module 200 having a set of memory banks with a common interface. An activate command is used to activate a tow in a bank and thus typically specifies a bank number and a row address. Data is then either read or written. Data is typically read or written as chunks of data over multiple clock cycles. Additionally, a read or a write also includes a bank number and a column address given to a memory chip. A row in a particular bank is open until it is closed with a precharge command. There are well-known time delays associated with performing a precharge Conventionally, arbiter 10S may attempt to place commands for the different clients in command queue 115 into a sequence of commands selected to achieve interleaving. For example, if the commands have an order in command queue 115 of 0, 1, and 2 then command queue 115 may have pointers to initiate precharge, activate and read/write (R/W) operations with memory banks accessed via DRAM controller 120 in the same order as the command queue. This permits, for example, memory commands entering the command queue to get an early start on preparing the memory banks for reads/writes taken out later at the queue head. For example a read/write can be performed for command "0" at the queue head, an activate for command "1", and a precharge for command "2." To support interleaving special "bank in use" tracking hardware 107 is typically included for arbiter 105 to keep track of the arbitration history.

One problem with the prior art is that the serial nature of a FIFO command queue 115 can make it difficult for arbiter 105 to select an ideal interleaving that avoids bank conflicts and does not waste clock cycles. Moreover, some commands may take a long access time while other commands may have an access time that is variable. As a consequence, in some applications it is difficult for arbiter 105 to make arbitration decisions that efficiently utilize the DRAM memory, resulting in lost clock cycles in which no productive work is performed.

Another problem with the prior art is latency introduced by command queue 115. The intent is to introduce enough delay between the precharge, activate, and read/write commands to facilitate overlapping bank operations. Too much delay adds undesired latency to requests. As one example, memory interface 100 may include a compression module 130 to perform read-modify-writes on atomic units of memory (e.g., memory tiles) based on whether a tag indicates that the source data is compressed or uncompressed. Some types of write commands may require decompression, resulting in a greater number of clock cycles to perform a full memory access operation. For example, a read-modify-write may include reading compressed data, decompressing the data, and writing the data back to memory to permit a client to perform a write. However, if the data is uncompressed, then a simple write operation is performed instead, which is a much shorter operation. As a result, there is potential variability in the time required to complete a memory access request. If several of these requests were residing in the command queue, latency would be unnecessarily high.

In light of the above-described problems, the apparatus and method of the present invention was developed.

SUMMARY OF THE INVENTION

A memory interface couples a plurality of clients to a memory having memory banks. The memory interface supports independent arbitration of at least activate decisions and read/write decisions.

One embodiment of a memory interface includes a bank state reporter to report memory status of a memory having memory banks. An activate arbiter has a first interface to a plurality of clients. The activate arbiter arbitrates activate decisions for the plurality of clients based on the bank status. A read/write arbiter has a second interface to the plurality of clients and the bank state reporter. The read/writer arbiter arbitrates read/write decisions for the plurality of clients based on the bank status. A memory controller issues activate sub-commands and read/write sub-commands to the memory based on arbitration decisions of the activate arbiter and the read/write arbiter. In one implementation, a precharge arbiter is also included to arbitrate precharge decisions for the plurality of clients.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 4:
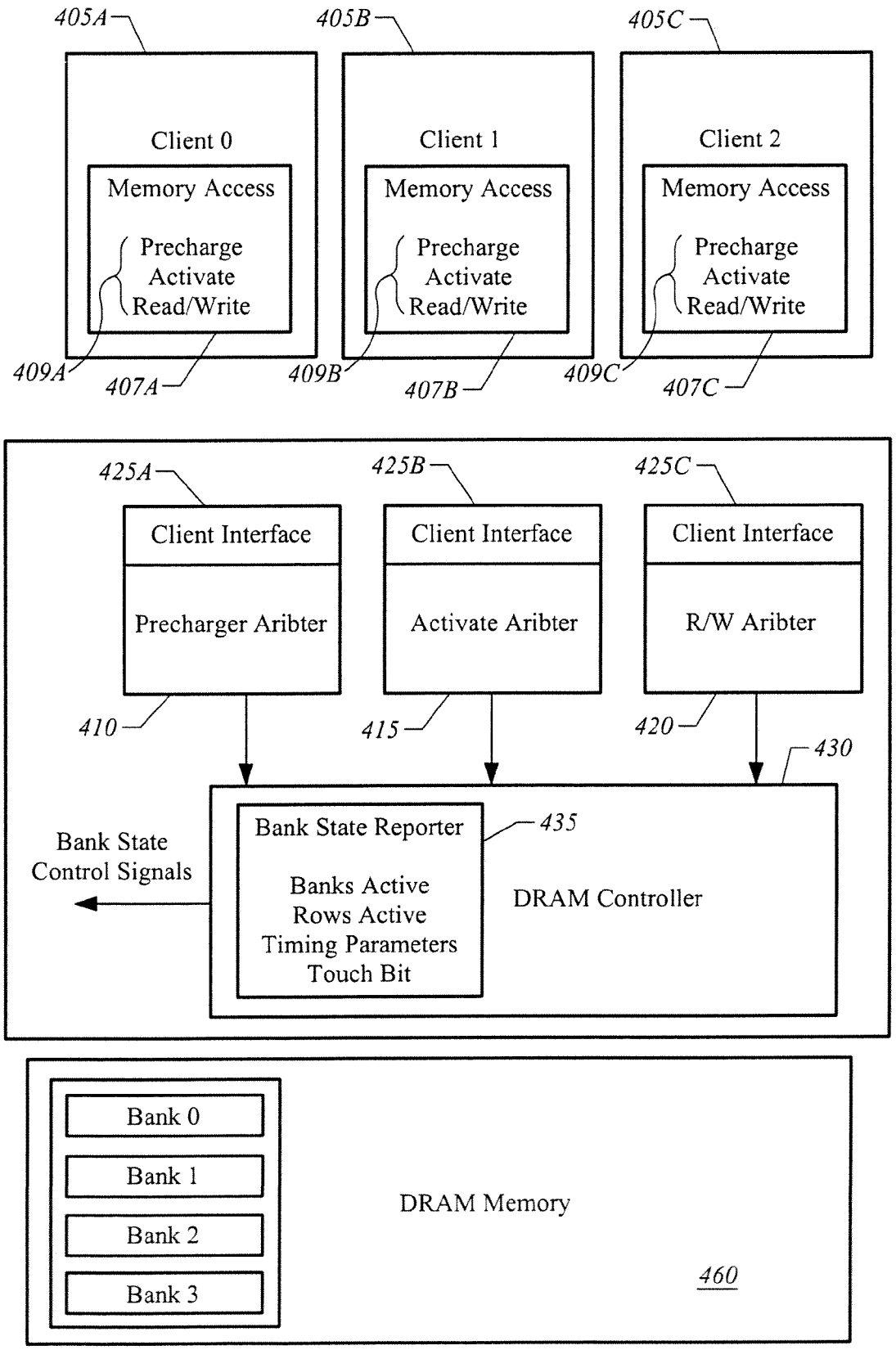
FIG. 4 illustrates a memory interface in accordance with one embodiment of the present invention.

FIG. 4 illustrate a memory interface 400 in accordance with one embodiment of the present invention. Memory interface 400 services a plurality of clients 405-A, 405-B, and 405-C, such as client 0, client 1, and client 2. For the purposes of illustration, three clients are shown although it will be understood that an arbitrary number of clients is contemplated. Memory interface 400 is used to provide access to a memory having memory banks, such as a DRAM memory 460 having a set of memory banks, such as bank 0, bank 1, bank 2, and bank 3. As is well known in the memory art, in a banked memory an individual read or write to a row requires that a memory bank be open and that an associated row within the same memory bank be activated.

At any one time, clients 405-A, 405-B, and 405-C have only one memory access request command 407-A, 407-B, and 407-C that is being serviced by memory interface 400. A banked memory 460 is typically implemented to access memory based on row-column-bank addressing of physical memory, which requires performing operations to prepare a row of a bank before a read/write is performed.

Each individual memory access request command 407-A, 407-B, or 407-C consequently has an associated implicit pipelined sequence 409-A, 409-B, and 409-C of memory sub-commands that DRAM controller 430 needs to execute to implement different phases of a memory access request with memory 460, such as an activate sub-command (if a bank/row for the corresponding memory address is closed), a read/write sub-command for a memory address, and a precharge sub-command (to close an open row/bank, assuming that a precharge is not automatically performed after a read/write). In one embodiment a memory access request command also includes information on the urgency of the request.

In one embodiment, only one memory access request command per client is arbitrated at any one time. However, each memory access request command 407-A, 407-B, and 407-C has implicit pipeline sub-commands 409-A, 409-B and 409-C for accessing regions of a banked DRAM memory 460 which are independently arbitrated. For example, assuming that each memory access request command implicitly has precharge, activate, and read/write sub-commands, arbitration functions for the different pipeline sub-command phases are handled by a precharge arbiter 410 activate arbiter 415, and read write arbiter 420. When a particular memory access request (e.g., 407-A) of a particular client 405-A has completed all of its sub-command phases, the next memory access request for the client is then serviced by memory interface 400. Note that for the purposes of illustration, the implicit pipelined sequences 409-A, 409-B, and 409-C are illustrated as being contained within individual memory request commands 407-A, 407-B, and 407-B although it will be understood that the implicit pipelined sequences may be inferred by each arbiter 410, 415, and 420.

Precharge arbiter 410, activate arbiter 415, and read/write arbiter 420 act independently and each has its own separate respective client interface 425-A, 425-B, and 425-C. For example, in one embodiment multiplexers are used to separately couple each client 405-A, 405-B, and 405-C to each client interface 425-A, 425-B, and 425-C without an intervening common command queue. For example, one memory access request command from each client may be coupled to each client interface 425-A, 425-B, and 425-C. Independent arbitration is performed for precharge, activate, and read/write sub-command phases of the memory access requests of different clients 405-A, 405-B, and 405-C. As a result, the arbitration of the different sub-command phases is dynamic. Each arbiter 410, 415, and 420 includes rules to prevent memory bank conflicts such that the result of independent arbitration is an efficient staggering of sub-command phases in different memory banks. For example, while one memory bank is being accessed for a read/write sub-command on behalf of one client the independent arbitration permits activate sub-command phases and precharge sub-command phases to be performed on other memory banks on the behalf of other clients.

The precharge arbiter 410 examines client memory access request commands and arbitrates precharge sub-commands to determine whether a precharge needs to be done to close a row in a bank. That is, precharge arbiter 410 examines open rows and makes an arbitration decision regarding which open banks, if any, should be closed on a particular clock cycle. In one embodiment a precharge closes when there is a miss to a bank. When there is a simultaneous hit and miss to a particular bank from different clients, then precharge arbiter 410 may weigh the client priorities and elect to close or not close the bank. In other words, in one embodiment precharge arbiter 410 considers client priorities and also hits and misses in determining whether to close a bank. There also may be a timer that closes a bank after a timeout period when there is no hit demand for that bank. Note that in an alternate embodiment that if a precharge automatically occurs after a read or a write that the precharge arbiter 410 may be omitted.

The activate arbiter 415 examines client memory access requests and arbitrates activate sub-commands to determine which bank needs to be open (and which row activated) in a particular clock cycle. That is, activate arbiter 415 examines closed rows of banks and makes an arbitration decision regarding which closed row/bank, if any, should be activated on a particular clock cycle.

The read/write arbiter 420 examines client memory access requests and arbitrates read/write sub-commands to determine which read/write sub-commands get to banks to do a read and a write. That is, read/write arbiter 420 examines activated banks/rows and makes an arbitration decision regarding which read/write sub-commands should be issued for activated rows. In one embodiment, misses are blocked from arbitration in the read/write arbiter 420 until a hit.

DRAM controller 430 includes a bank state reporter module 435 that monitors which banks are active, which rows are active, and monitors timing parameters. Bank state reporter module 435 generates control signals that are provided to precharge arbiter 410, activate arbiter 415, and read/write arbiter 420 based on the status of the state of memory 460. In one embodiment, an individual bit, called a touch bit, is used to indicate at least one read/write has been performed on a bank. The purpose of the touch bit is to prevent the precharge arbiter from closing a newly opened bank that has not yet performed a read/write. For example, in one implementation, a bank remains open (within a timeout period) until it is read/written, at which time the touch bit is set, making the bank eligible for precharge. In one implementation a default condition is that a bank that has been touched remains open to facilitate servicing additional read/write sub-commands from the same client that initiated the initial touch. Under special circumstance, a high priority client may allow the precharge arbiter to close an untouched bank to allow lower latency for that, client.

The information provided by bank state reporter 435 to precharge arbiter 410, activate arbiter 415 and read/write arbiter 42*a* permits independent arbitrations based on knowledge of bank state. For example, in order for an activate to happen on a particular bank, the bank has to be already shut. Thus, arbitration decisions made by activate arbiter 415 are performed by arbitrating between banks already closed which requires knowledge of bank state sufficient to identify banks that are closed. The read/write arbiter 420 arbitrates between banks already open and matching the same row ("a hit"), which requires knowledge of bank state sufficient to identify open banks. Precharge is performed only on open banks. Thus, precharge arbiter 410 also requires knowledge of bank state sufficient to identify open banks.

In one embodiment precharge arbiter 410, activate arbiter 415, and read/write arbiter 420 are DRAM timing aware. That is, bank state reporter module 435 also reports DRAM timing parameters. This permits arbiters 410, 415, and 420 to estimate when banks will be available for precharge, activate, and read/write operations. As a consequence, in one embodiment each arbiter takes into account DRAM timing parameters when making arbitration decisions. For example, precharge arbiter 410 may make arbitration decisions based, in part, on whether DRAM bank precharging timing conditions are met; activate arbiter 415 may make arbitration decisions based, in part, on whether DRAM bank activate timing conditions are met; and read/write arbiter 420 may make arbitration decisions based, in part, on whether DRAM bank read/write timing conditions are met.

In one embodiment, DRAM controller 430 receives the arbitration decisions of the different arbiters 410, 415, and 420 and then DRAM controller 430 issues precharge, activate, and read/write sub-commands to DRAM memory 460. As previously described, the different arbiters 410, 415, and 420 have bank state information from which they determine an appropriate set of banks/rows to perform an arbitration. For example, on a particular clock cycle, clients arbitrated by the activate arbiter 415 are not arbitrated by the read/write arbiter 420 because the activate arbiter arbitrates with respect to closed banks whereas the read/write arbiter 420 arbitrates with respect to activated banks/rows. Thus, while the arbitration decisions of the different arbiters 410, 415, and 420 are made independently the arbitration rules that are applied result in an efficient bank interleaving that avoids bank conflicts. Moreover, the independent arbitration permits efficient interleaving even for the case of variable memory access time, such as read-modify-write operations, or requests that transfer multiple data. The arbiters can also use the bank timing information to only accept a command when the DRAM can process it. By not making a premature arbitration decision, a better choice is made using the most recent client information.

Arbitration decisions can be based on weighted factors. In one embodiment, an individual request has a priority defined by a weight based on client urgency (how urgently a client needs a memory access) and efficiency (how efficient the memory access is likely to be given the size of transfers and latency).

Note that in many applications a client may generate memory access requests to the same region of memory. Consequently, it is typically desirable once a bank has been open to leave it open as long as practical. In one embodiment, the touch bit is set the first instance that a read/write is performed on the bank and then the bank left open as long as practical. This permits DRAM pages to be kept open in a case a client may come back to the bank and no other client demands the bank. This also reduces power consumption in that the cycling of memory banks, which consumes power, is reduced. Additionally, this allows large transfers from a client to be broken into smaller pieces and interleaved with other requests to reduce contention latency.

In one embodiment, the read/write arbiter 420 sets a quanta of work. That is, read/write arbiter 420 arbitrates for programmable number of clocks to the same row and bank. A programmable number of clocks correspond to a batch mode. The size of the batch may be based on the DRAM timing parameters.

Figure 1:
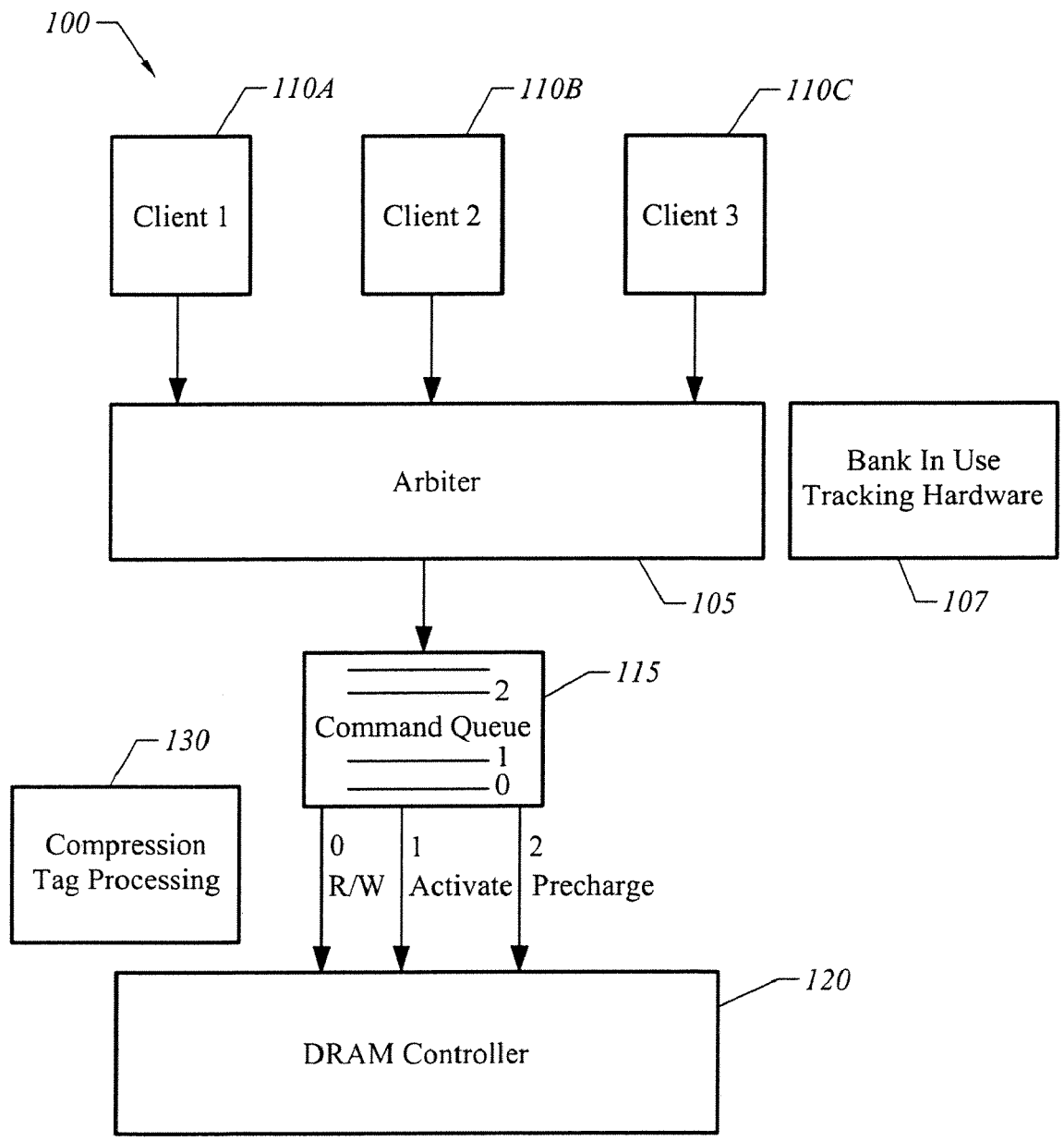
FIG. 1 illustrates a prior art memory interface having a serial command queue.
Figure 2:
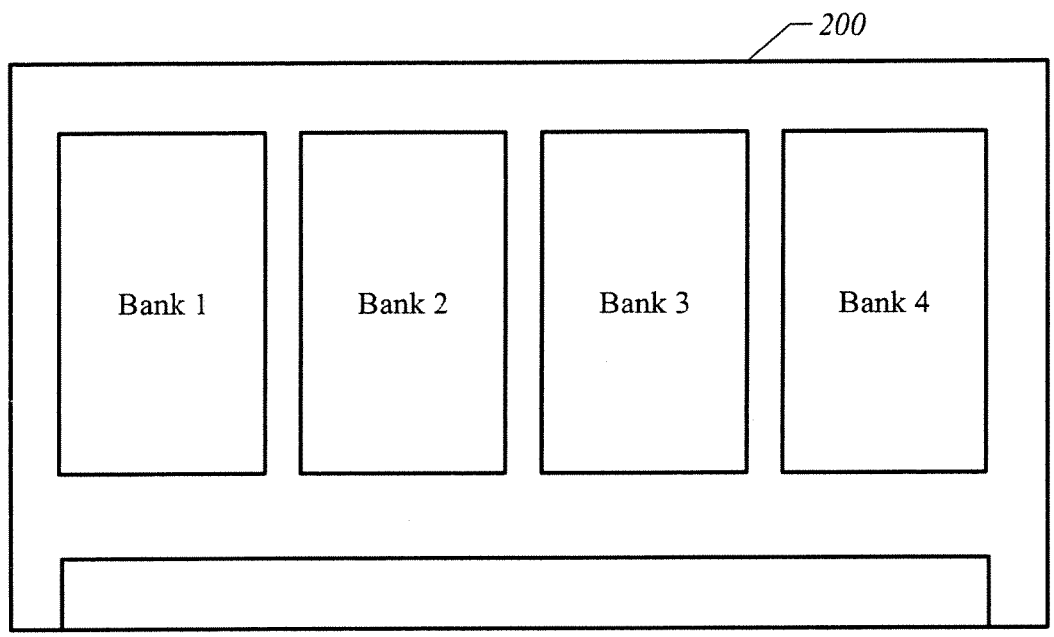
FIG. 2 illustrates a conventional DRAM module with memory banks.
Figure 3:
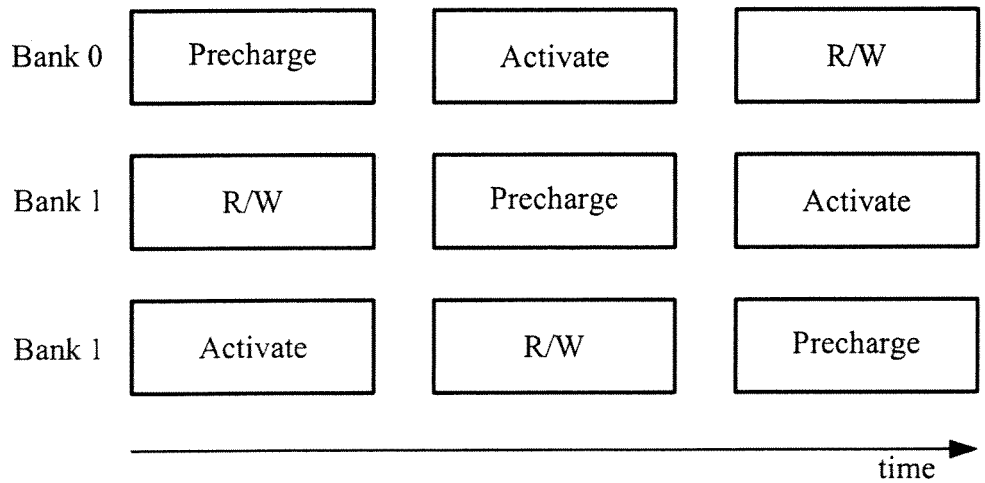
FIG. 3 illustrates conventional DRAM interleaving.

Embodiments of the present invention provide several advantages over the prior art illustrated in FIG. 1 which utilize a conventional FIFO memory command queue 115. Because reads and writes in a conventional FIFO command queue 115 are committed, a subsequent request from a client requiring low latency must wait for these previous requests to complete before being serviced. In a preferred embodiment of the invention, there is no command queue 115. As a result, a preferred embodiment of the present invention permits an urgent request to be accepted without delay. Additionally, by coupling arbitration decisions to the state and timing of the DRAM banks, a preferred embodiment of the present invention performs "just in time" arbitration, only issuing commands when the DRAM can accept them. These later arbitrations use the most recent request information from clients and the best arbitration decision is made.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A memory interface for interleaving memory requests, comprising:
   a memory controller to access a dynamic random access memory having memory banks with precharge, activate, and read/write phases;
   a bank state reporter coupled to said memory controller to report memory bank status information;
   an activate arbiter having a first interface to a plurality of clients, said activate arbiter receiving information from said bank state reporter indicative of banks that are closed, said active arbiter arbitrating activate decisions for said plurality of clients to activate closed banks based on at least one priority rule; and
   a read/write arbiter having a second interface to said plurality of clients, said read/write arbiter receiving information from said bank state reporter indicative of banks that are activated, said read/write arbiter arbitrating read/write decisions for said plurality of clients based on at least one priority rule.

2. The memory interface of claim 1, further comprising a precharge arbiter having a third interface to a plurality of clients, said precharge arbiter arbitrating precharge decisions for said plurality of clients.

3. A memory interface, comprising:
   a bank state reporter to report memory bank status of a memory having memory banks;
   an activate arbiter having a first interface to a plurality of clients said activate arbiter arbitrating activate decisions for said plurality of clients based on said bank status;
   a read/write arbiter having a second interface to said plurality of clients and said bank state reporter, said read/writer arbiter arbitrating read/write decisions for said plurality of clients based on said bank status; and a memory controller to issue activate sub-commands and read/write sub-commands to said memory based on arbitration decisions of said activate arbiter and said read/write arbiter;

a precharge arbiter having a third interface to a plurality of clients, said precharge arbiter arbitrating precharge decisions for said plurality of clients based on said bank status such that said memory interface is operative to independently arbitrate recharge sub-commands activate sub-commands, and read/write sub-commands for said plurality of clients;

wherein said bank status comprises information on banks that are active and rows that are active.

4. The memory interface of claim 3, wherein said activate arbiter arbitrates activation of closed banks.

5. The memory interface of claim 3, wherein said read/write arbiter arbitrates between banks that are already open.

6. The memory interface of claim 3, wherein said precharge arbiter arbitrates to determine which open banks to be closed.

7. The memory interface of claim 3, wherein said bank state reporter records when at least one read/write has been performed on the behalf of a client to a bank to indicate a touch of a bank.

8. The memory interface of claim 7, wherein said bank is to remain open until it is read/written, at which time the touch bit is set, and the bank is eligible for precharge.

9. The memory interface of claim 6, wherein a high priority client may cause an untouched bank to be precharged under certain circumstances.

10. The memory interface of claim 6, wherein a default condition is that a bank that has been touched may remain open to facilitate servicing additional read/write sub-commands from the same client that initiated the initial touch or another client with an address that matches the open row bank address.

11. The memory interface of claim 6, wherein a default condition is that a bank has been touched may be precharged after a timeout period and no hit demand for that bank.

12. The memory interface of claim 3, wherein said bank status comprises DRAM timing parameters.

13. The memory interface of claim 3, wherein said activate arbiter arbitrates activation of closed banks when DRAM bank activate timing conditions are met.

14. A method of interfacing a dynamic random access memory having memory banks, comprising:

monitoring memory bank status information of a dynamic random access memory having memory banks with precharge activate, and read/write phases;

receiving information indicative of banks that are closed;

receiving information indicative of banks that are activated;

independently arbitrating an activate sub-command for a plurality of clients; and independently arbitrating a read/write sub-command for said plurality of clients;

wherein independent arbitration is utilized to interleave memory requests.

15. The method of claim 14, further comprising: independently arbitrating a precharge for said plurality of clients.

16. The method of claim 14, further comprising: monitoring bank state for use in performing arbitration.

17. The method of claim 14, wherein said independently arbitrating an activate sub-command includes determining closed banks.

18. The method of claim 14, wherein said independently arbitrating a read/write sub-command includes determining activated banks.

* * * * *